United States Patent
Shiraishi et al.

(10) Patent No.: US 6,391,246 B2
(45) Date of Patent: *May 21, 2002

(54) METHOD FOR FORMING FIBER-REINFORCED COMPOSITE MEMBER

(75) Inventors: Koji Shiraishi; Makoto Nasu, both of Saitama-ken (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,616

(22) Filed: Nov. 13, 1997

(30) Foreign Application Priority Data

Nov. 15, 1996 (JP) .............................. 8-321044

(51) Int. Cl.[7] .............................. B29C 70/44; B29D 9/00
(52) U.S. Cl. .............. 264/510; 264/511; 264/102; 264/257; 264/258; 156/70; 156/289
(58) Field of Search .............................. 264/510, 511, 264/257, 313, 258, 102; 156/60, 70, 247, 289

(56) References Cited

U.S. PATENT DOCUMENTS

| | | | | | |
|---|---|---|---|---|---|
| 1,473,842 A | * | 11/1923 | Frederick | ............ | 264/324 |
| 2,572,924 A | * | 10/1951 | Gonda | ............ | 154/117 |
| 3,004,295 A | * | 10/1961 | Bottoms et al. | ............ | 264/510 |
| 3,146,148 A | * | 8/1964 | Mitchella et al. | ............ | 264/511 |
| 3,666,600 A | * | 5/1972 | Yoshino | ............ | 264/510 |
| 3,703,422 A | * | 11/1972 | Yoshino | ............ | 156/87 |
| 3,703,572 A | * | 11/1972 | Bellasalma | ............ | 264/510 |
| 3,704,970 A | * | 12/1972 | Reeves | ............ | 425/128 |
| 3,710,733 A | * | 1/1973 | Story | ............ | 264/510 |
| 3,795,559 A | * | 3/1974 | Horn et al. | ............ | 156/173 |
| 3,923,951 A | | 12/1975 | Pukszta, Jr. | | |
| 4,065,340 A | * | 12/1977 | Dickerson | ............ | 264/511 |
| 4,155,967 A | * | 5/1979 | South et al. | ............ | 264/32 |
| 4,256,790 A | * | 3/1981 | Lackman et al. | ............ | 428/73 |
| 4,267,142 A | * | 5/1981 | Lankheet | ............ | 264/510 |
| 4,311,661 A | * | 1/1982 | Palmer | ............ | 264/510 |
| 4,323,623 A | * | 4/1982 | Aherns et al. | ............ | 428/246 |
| 4,331,723 A | * | 5/1982 | Hamm | ............ | 428/61 |
| 4,492,607 A | * | 1/1985 | Halcomb | ............ | 156/242 |
| 4,565,595 A | * | 1/1986 | Whitener | ............ | 156/172 |
| 4,608,220 A | * | 8/1986 | Caldwell et al. | ............ | 264/510 |
| 4,622,091 A | * | 11/1986 | Letterman | ............ | 156/286 |
| 4,676,853 A | * | 6/1987 | Lerma | ............ | 156/87 |
| 4,721,593 A | * | 1/1988 | Kowal | ............ | 264/258 |
| 4,780,263 A | * | 10/1988 | Atkin et al. | ............ | 264/511 |
| 4,789,416 A | | 12/1988 | Ford | | |

(List continued on next page.)

FOREIGN PATENT DOCUMENTS

| | | | | |
|---|---|---|---|---|
| DE | 1053599 | * | 3/1959 | ............ 156/194 |
| JP | 07 108529 A | | 4/1995 | |

*Primary Examiner*—Ian H. Silbaugh
*Assistant Examiner*—Stefan Staicovici
(74) *Attorney, Agent, or Firm*—Birch, Stewart, Kolasch & Birch, LLP

(57) ABSTRACT

A novel fiber-reinforced composite member having at least one projection is formed by (a) disposing a preform made of a fiber-reinforced composite material on a forming plate; (b) placing a shape-retention means composed of a plurality of soft unit members adjacent to each projection of the preform; (c) completely covering the preform and the shape-retention means with a bagging film having a sealant attached to the periphery; (d) adhering the sealant to the forming plate such that the preform and the shape-retention means are completely sealed by the bagging film; (e) evacuating the inside of the bagging film; and (f) heating the preform under pressure to form a fiber-reinforced composite member.

22 Claims, 2 Drawing Sheets

U.S. PATENT DOCUMENTS

| | | | |
|---|---|---|---|
| 4,816,106 A | * 3/1989 | Turris et al. | 264/510 |
| 4,882,118 A | * 11/1989 | Megarry | 264/510 |
| 4,942,013 A | * 7/1990 | Palmer et al. | 264/511 |
| 4,955,803 A | 9/1990 | Miller et al. | |
| 5,015,168 A | * 5/1991 | Boime et al. | 264/571 |
| 5,059,377 A | * 10/1991 | Ashton et al. | 264/313 |
| 5,084,120 A | * 1/1992 | Fischer et al. | 156/233 |
| 5,096,649 A | * 3/1992 | Hansson | 264/258 |
| 5,132,070 A | * 7/1992 | Paul et al. | 264/324 |
| 5,192,383 A | * 3/1993 | Cavin | 264/258 |
| 5,225,015 A | * 7/1993 | Allaire et al. | 264/316 |
| 5,236,646 A | * 8/1993 | Cochran et al. | 264/511 |
| 5,266,021 A | 11/1993 | Jacobson | |
| 5,292,475 A | 3/1994 | Mead et al. | |
| 5,322,661 A | * 6/1994 | Henrio | 264/510 |
| 5,344,601 A | * 9/1994 | Newton | 264/510 |
| 5,366,684 A | * 11/1994 | Corneau, Jr. | 264/510 |
| 5,433,165 A | * 7/1995 | McGuiness et al. | 264/510 |
| 5,433,915 A | * 7/1995 | Yamamoto et al. | 264/510 |
| 5,454,895 A | * 10/1995 | Imparato | 264/510 |
| 5,547,628 A | 8/1996 | Lacombe et al. | |
| 5,573,716 A | 11/1996 | Jacobson | |
| 5,593,633 A | * 1/1997 | Dull et al. | 264/510 |
| 5,637,272 A | * 6/1997 | Yamamoto et al. | 264/510 |
| 5,709,893 A | * 1/1998 | McCarville et al. | 264/257 |
| 5,714,179 A | * 2/1998 | Goodridge et al. | 425/394 |
| 5,759,325 A | * 6/1998 | Davis | 264/511 |
| 5,817,269 A | * 10/1998 | Younie et al. | 264/258 |
| 6,001,301 A | * 12/1999 | Kinoshita et al. | 264/510 |

* cited by examiner

METHOD FOR FORMING FIBER-REINFORCED COMPOSITE MEMBER

BACKGROUND OF THE INVENTION

The present invention relates to a method for forming a fiber-reinforced composite member, particularly to a method for forming fiber-reinforced composite members having various shapes by using reusable shape-retention auxiliary members.

Because fiber-reinforced composite materials composed of reinforcing fibers impregnated with thermosetting or thermoplastic resins are light in weight and have high strength, they are widely used for various structural parts of vehicles, vessels, aircraft, etc.

A fiber-reinforced composite member is usually formed from a plurality of prepregs each constituted by a fabric of reinforcing fibers impregnated with thermosetting or thermoplastic resins, and laminated on a forming plate of a predetermined shape to form a preform, which is then compressed into a fiber-reinforced composite member of a predetermined shape while heating. Though a pressuring bag film or bagging film is used at the time of heating of the preform under pressure, the preform is likely to be deformed due to fluidization of the resin in the preform during the forming process if the preform has a complex outer shape, resulting in unsatisfactory dimensional accuracy in the formed fiber-reinforced composite member. Accordingly, shape-retention means made of a silicone rubber, etc. have conventionally been placed adjacent to projections of the preform to prevent the deformation of the preform, thereby seeking to improve the dimensional accuracy of the formed fiber-reinforced composite member.

FIGS. 4 and 5 show an example of conventional methods for forming a fiber-reinforced composite member by using a shape-retention means. A preform 1 of a fiber-reinforced composite material disposed on a forming plate 4 is composed of a flat portion 11 and a plurality of rib portions 12, 12'. The shape-retention means 3 has a complementary shape to the preform 1, and has recesses 31, 31' for receiving the rib portions 12, 12' on a lower surface thereof. As is shown in FIG. 5, after fitting the shape-retention means 3 to the preform 1, the preform 1 and the shape-retention means 3 are completely covered by a bagging film 5. A sealant 6 provided on a periphery of the bagging film 5 adheres to the forming plate 4. After evacuating the inside of the bagging film 5 via an air-suction opening 7, the preform 1 and the shape-retention means 3 completely covered by the film 5 are heated under pressure to form a fiber-reinforced composite member.

It is necessary in the above conventional method to provide an integral shape-retention means 3 having a completely complementary shape to that of the preform 1. A lot of time and steps are required for forming such shape-retention means 3. Also, the shape-retention means 3 is made of a silicone rubber which shrinks during the formation process of the fiber-reinforced composite material because of forming pressure and a chemical reaction of the silicone rubber with the epoxy resin in the preform 1. As a result, as shown in FIG. 6, the recesses 31, 31' of the once used shape-retention means 3 are out of alignment with the rib portions 12, 12' of the preform 1, making it impossible to use the shape-retention means 3 repeatedly. Further, because an integral shape-retention means 3 should be formed in conformity with each preform 1 of a particular shape, a shape-retention means 3 for one preform 1 cannot be used for another preform 1.

OBJECT AND SUMMARY OF THE INVENTION

Accordingly, an object of the present invention is to provide a method for efficiently forming a fiber-reinforced composite member by using a shape-retention means which is repeatedly reusable and adapted to preforms of different shapes.

As a result of intense research in view of the above object, the inventors have found that by using a shape-retention means composed of a proper combination of soft unit members deposed on the outer shape of a preform composed of a fiber-reinforced, the fiber-reinforced composite member can be formed easily at a low cost.

Thus, the method for forming a fiber-reinforced composite member according to the present invention comprises the steps of (a) placing a shape-retention means adjacent to at least one projection of a preform made of a fiber-reinforced composite material; (b) completely sealing the preform and the shape-retention means with a bagging film; and (c) forming the preform into a fiber-reinforced composite member by heating under pressure, the shape-retention means being composed of a plurality of soft unit members.

Though not restrictive, the shape-retention means is preferably composed of a plurality of units having simple cross-sectional shapes such as a triangular prism, a rectangular parallelepiped, a flat plate, etc., which may be obtained by dividing an integral shape-retention means covering an entire surface of the preform. More preferably, the units are in a shape having a cross section constituted by curves having no acute angles of 90° or less. With simple shapes, the assembled shape-retention means provide a gradually changing contour, avoiding excess load from applying to a bagging film. However, the shape-retention means may partially have slight projections or recesses, thereby promoting ease of handling.

In a preferred embodiment of the present invention, the method for forming a fiber-reinforced composite member comprises the steps of (a) disposing a preform made of a fiber-reinforced composite material and having at least one projection on a forming plate; (b) placing a shape-retention means composed of a plurality of soft unit members adjacent to each projection of the preform; (c) completely covering the preform and the shape-retention means with a bagging film having a sealant attached to a periphery thereof; (d) adhering the sealant to the forming plate such that the preform and the shape-retention means are completely sealed by the bagging film; (e) evacuating the inside of the bagging film; and (f) heating the preform under pressure to form it into a fiber-reinforced composite member.

DETAILED DESCRIPTION OF THE PREFERRED EMBODIMENTS

The method for forming a fiber-reinforced composite member according to the preferred embodiments of the present invention will be explained in detail referring to FIGS. 1–3 attached hereto, without intention to restrict the present invention thereto.

Figure 1:
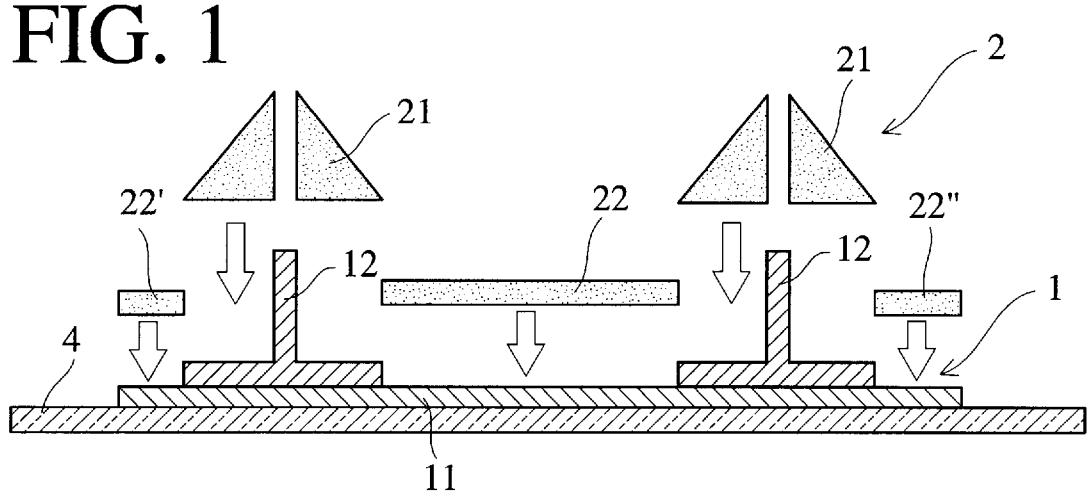
FIG. 1 is a cross-sectional view showing a plurality of soft unit members to be placed on a preform of a fiber-reinforced composite material according to one embodiment of the present invention.

FIG. 1 is a cross-sectional view showing a shape-retention means 2 composed of a plurality of soft unit members which are to be combined with a preform. The preform 1 of a fiber-reinforced composite material disposed on a forming plate 4 comprises a flat portion 11 and two rib portions 12, 12'.

The shape-retention means 2 is composed of a plurality of soft unit members each having a simple shape. The assembled soft unit members provide a gradually changing contour over the outer surface of the preform 1. The soft unit members preferably have cross-sectional shapes such as a triangle, a rectangle, etc.

In this embodiment, the shape-retention means 2 is composed of triangular soft unit members 21 to be placed on both sides of each rib portion 12, 12' of the preform 1 and flat soft unit members 22, 22', 22" to be placed on the flat portion 11 of the preform 1. As shown in FIG. 2, when the shape-retention means 2 composed of soft unit members 21, 22, 22', 22" is placed on the preform 1, the preform 1 is provided with a gradually changing contour, thereby preventing each rib portion 12, 12' from being subjected to a deforming stress while pressing. Even a preform 1 having an irregular outer surface can be provided with a gradually changing contour by covering it with various soft unit members of different sizes having the same or different shapes.

The preform 1 of a fiber-reinforced composite material may be formed by laminating a plurality of prepregs of reinforcing fibers such as carbon fibers, glass fibers, aramide fibers, etc. impregnated with thermosetting or thermoplastic resins, the prepregs being half-cured or fused if necessary. The preferred thermosetting resins are epoxy resins, and the preferred thermoplastic resins are nylons.

Each soft unit member constituting the shape-retention means 2 is preferably made of a soft, heat-resistant elastomer with good releasability, particularly made of a silicone rubber. Pressure is uniformly exerted onto the entire surface of the preform 1 via the shape-retention means 2, making it possible to carry out the formation of the fiber-reinforced composite member without deformation. In the case of a preform 1 with curved surfaces, plate-shaped soft unit members may be placed and curved along the curved surfaces of the preform 1. In this case, the plate-shaped soft unit members are preferably as thick as 10 mm or less.

The preform 1 may be constituted by a plurality of separate parts such as the flat portion 11 and the rib portions 12, 12'. In this case, it is preferable that the parts of the preform 1 are slightly fixed or adhered to each other in advance to secure the dimensional accuracy of the resultant fiber-reinforced composite member. The soft unit members of the shape-retention means may also be slightly fixed or adhered to the preform 1 in advance.

Figure 2:
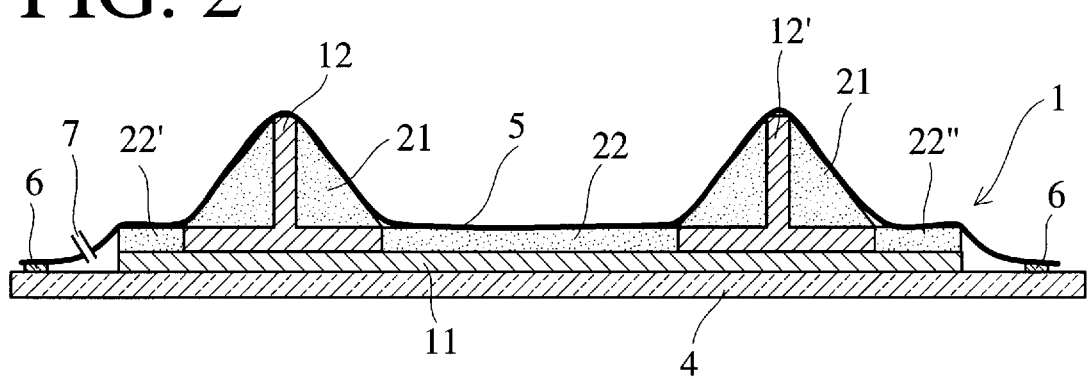
FIG. 2 is a cross-sectional view showing the bagging of the preform and the shape-retention means constituted by a plurality of soft unit members placed on the preform.

As is shown in FIG. 2, after covering the preform 1 with the shape-retention means 2, a bagging film 5 is disposed on the shape-retention means 2 and the preform 1 such that the bagging film 5 completely covers them. The bagging film 5 is sealed by adhering a sealant tape 6, etc. attached to a periphery of the bagging film 5 to the forming plate 4. After evacuating the inside of the bagging film 5 via an air-suction tube 7 provided onto the bagging film 5, the preform 1 is heated under pressure. As a result, the thermosetting or thermoplastic resin in the fiber-reinforced composite material is fluidized, thereby making the fiber-reinforced composite material integral to provide an integral fiber-reinforced composite member. The heating temperature is preferably within 180–250° C. in general, though it may vary depending on the types of thermosetting or thermoplastic resins used.

The bagging film 5 preferably has a heat resistance of 180° C. or higher when the prepreg contains a thermosetting resin, and 250° C. or higher when the prepreg contains a thermoplastic resin. Specifically, the bagging film 5 may be a film of nylon, polyimide, etc. The bagging film 5 preferably has a thickness of about 50–75 $\mu$m.

Figure 3:
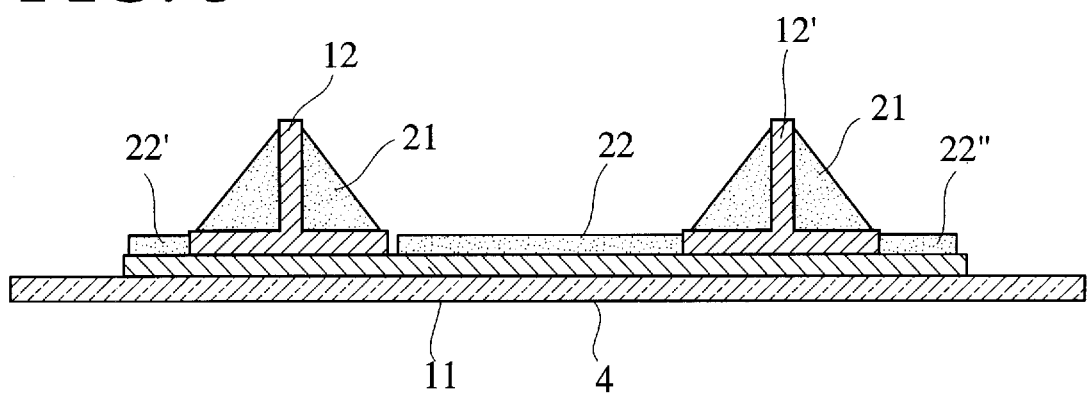
FIG. 3 is a cross-sectional view showing the used soft unit members which have slight shrinkage.
Figure 4:
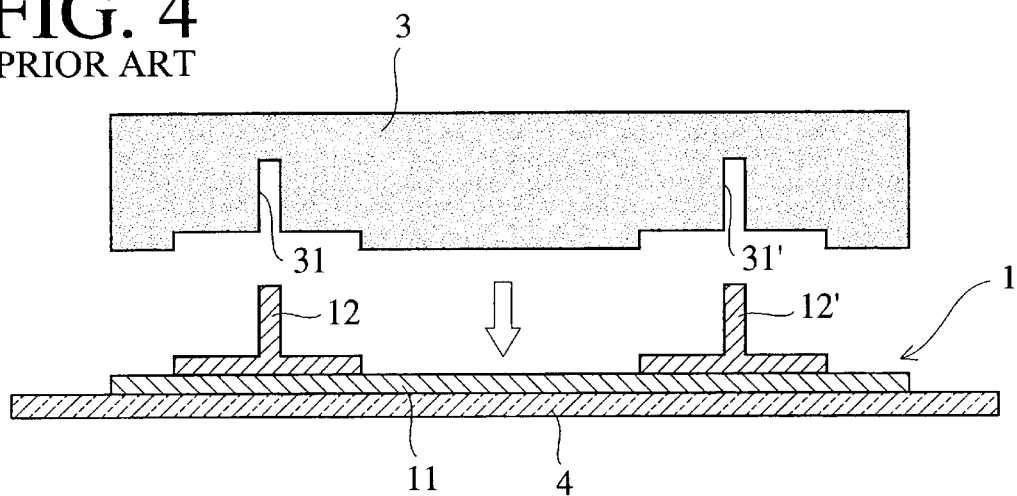
FIG. 4 is a cross-sectional view showing a conventional shape-retention means to be combined with the preform.
Figure 5:
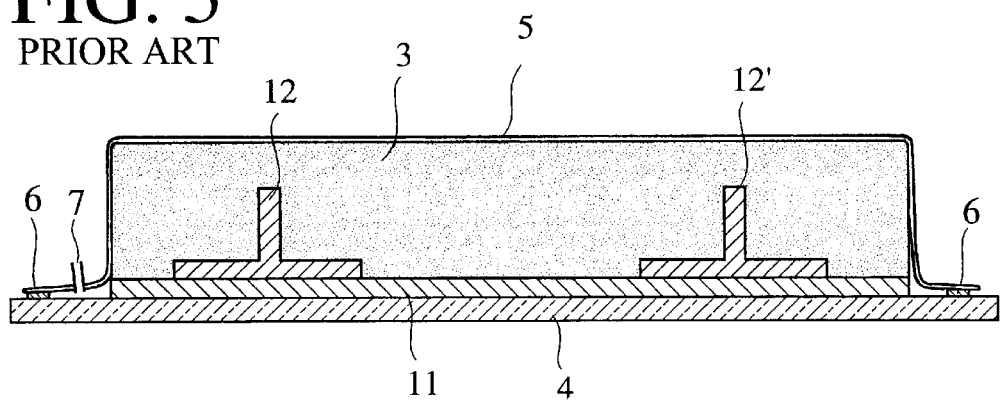
FIG. 5 is a cross-sectional view showing the bagging of the preform and the conventional shape-retention means.
Figure 6:
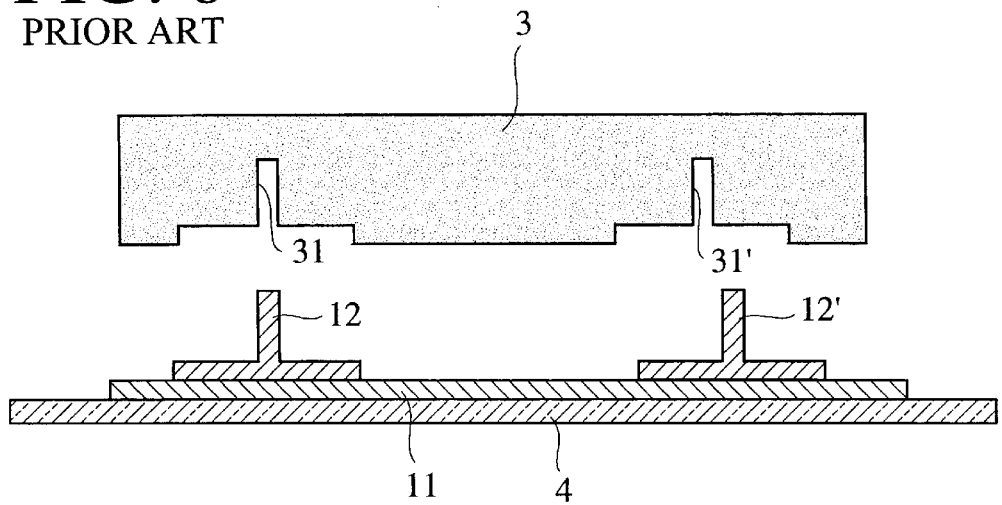
FIG. 6 is a cross-sectional view showing the used conventional shape-retention means which shrank, whereby the recesses of the shape-retention means are out of alignment with the projections of the preform.

As shown in FIG. 3, heating under pressure causes each soft unit member made of a silicone rubber, etc. to slightly shrink. Since the shape-retention means 2 is composed of a plurality of soft unit members, however, sufficient alignment can be achieved between the used soft unit members and the preform 1, though there is shrinkage in individual used soft unit members placed on the surface of the preform 1. Though there arise some gaps between adjacent used soft unit members placed on the preform 1, such gaps do not pose any problems in making the forming pressure uniform. It is noted from FIG. 3 that the portions of the preform 1 vulnerable to deformation, such as rib portions 12, 12', are fully protected by the soft unit members.

Though the method for forming a fiber-reinforced composite member according to the present invention has been explained referring to the attached drawings, the present invention is not restricted thereto, and any variations and modifications are possible unless the scope and spirit of the present invention are changed.

As described in detail above, because the shape-retention means is composed of a plurality of soft unit members of various sizes and shapes, any shapes of preforms of fiber-reinforced composite materials can be covered by the shape-retention means by properly combining the soft unit members. Because the soft unit members of simple shapes per se can be produced easily, the production cost of the shape-retention means is also drastically reduced, thereby making it possible to form a fiber-reinforced composite member at a low cost.

What is claimed is:

1. A method for forming a fiber-reinforced composite member, comprising the steps of
   (a) placing a shape-retention means adjacent to at least one projection of a preform made of a fiber-reinforced composite material;
   (b) completely sealing said preform and said shape-retention means with a bagging film; and
   (c) forming said preform into a fiber-reinforced composite member by heating under pressure;
   said shape-retention means comprising a plurality of soft unit members having simple cross-sectional shapes selected from the group consisting of a triangular prism, a rectangular parallelepiped, and a flat plate, wherein said unit members are reuseable;
   wherein said plurality of soft unit members substantially covers the surface of said pre-form to provide a gradually changing contour to prevent said at least one projection from being subjected to deforming during pressing.

2. The method for forming a fiber-reinforced composite member according to claim 1, wherein said preform and said shape-retention means sealed in said bagging film are subjected to said step of heating while evacuating an inside of said sealed bagging film.

3. A method for forming a fiber-reinforced composite member having at least one projection, comprising the steps of
   (a) disposing a preform having projections and made of a fiber-reinforced composite material on a forming plate;
   (b) placing a shape-retention means adjacent to each projection of said preform;
   (c) completely covering said preform and said shape-retention means with a bagging film having a sealant attached to a periphery thereof;
   (d) adhering said sealant to said forming plate such that said preform and said shape-retention means are completely sealed by said bagging film;
   (e) evacuating an inside of said bagging film; and
   (f) heating said preform under pressure to form said fiber-reinforced composite member;
   wherein said shape-retention means comprises a plurality of soft unit members having simple cross-sectional shapes selected from the group consisting of a triangular prism, a rectangular parallelepiped, and a flat plate, wherein said unit members are reuseable;
   wherein said plurality of soft unit members substantially covers the surface of said pre-form to provide a gradually changing contour to prevent said at least one projection from being subjected to deforming during pressing.

4. The method for forming a fiber-reinforced composite member according to claim 1, wherein said soft unit members have simple cross-sectional shapes such as a triangle or a rectangle.

5. The method for forming a fiber-reinforced composite member according to claim 3, wherein said soft unit members have simple cross-sectional shapes such as a triangle or a rectangle.

6. The method for forming a fiber-reinforced composite member according to claim 1, wherein the fiber-reinforced composite material is formed by laminating a plurality of prepregs comprising reinforcing fibers impregnated with thermosetting or thermoplastic resins.

7. The method for forming a fiber-reinforced composite member according to claim 6, wherein the reinforcing fibers are selected from the group consisting of carbon fibers, glass fibers, and aramide fibers.

8. The method for forming a fiber-reinforced composite member according to claim 6, wherein the thermosetting resins comprise epoxy resins.

9. The method for forming a fiber-reinforced composite member according to claim 6, wherein the thermoplastic resins comprise nylons.

10. The method for forming a fiber-reinforced composite member according to claim 1, wherein the bagging film comprises nylon or polyimide.

11. The method for forming a fiber-reinforced composite member according to claim 1, wherein the bagging film has a thickness of about 50–75 $\mu$m.

12. The method for forming a fiber-reinforced composite member according to claim 6, wherein the heating is performed at about 180–250° C.

13. The method for forming a fiber-reinforced composite member according to claim 6, wherein the bagging film has a heat resistance of 180° C. or higher when the prepregs contain a thermosetting resin and 250° C. or higher when the prepregs contain a thermoplastic resin.

14. The method for forming a fiber-reinforced composite member according to claim 3, wherein the fiber-reinforced composite material is formed by laminating a plurality of prepregs comprising reinforcing fibers impregnated with thermosetting or thermoplastic resins.

15. The method for forming a fiber-reinforced composite member according to claim 14, wherein the reinforcing fibers are selected from the group consisting of carbon fibers, glass fibers, and aramide fibers.

16. The method for forming a fiber-reinforced composite member according to claim 14, wherein the thermosetting resins comprise epoxy resins.

17. The method for forming a fiber-reinforced composite member according to claim 14, wherein the thermoplastic resins comprise nylons.

18. The method for forming a fiber-reinforced composite member according to claim 3, wherein the bagging film comprises nylon or polyimide.

19. The method for forming a fiber-reinforced composite member according to claim 3, wherein the bagging film has a thickness of about 50–75 $\mu$m.

20. The method for forming a fiber-reinforced composite member according to claim 14, wherein the heating is performed at about 180–250° C.

21. The method for forming a fiber-reinforced composite member according to claim 14, wherein the bagging film has a heat resistance of 180° C. or higher when the prepregs contain a thermosetting resin and 250° C. or higher when the prepregs contain a thermoplastic resin.

22. A method for forming a fiber-reinforced composite member, comprising the steps of
   (a) placing a shape-retention means comprising a plurality of soft, reuseable unit members having simple cross-sectional shapes adjacent to at least one projection of a preform made of a fiber-reinforced composite material;
   (b) completely sealing said preform and said shape-retention means with a bagging film; and
   (c) forming said preform into a fiber reinforced composite member by heating under pressure;
   wherein said plurality of soft unit members substantially covers the surface of said pre-form to provide a gradually changing contour to prevent said at least one projection from being subjected to deforming during pressing.

* * * * *